United States Patent [19]

Teremy et al.

[11] Patent Number: 5,541,695
[45] Date of Patent: Jul. 30, 1996

[54] CAMERA WITH LASER REMOTE CONTROLLER

[75] Inventors: Paul Teremy, Rochester; Dale F. McIntyre, Honeoye Falls, both of N.Y.

[73] Assignee: Eastman Kodak Company, Rochester, N.Y.

[21] Appl. No.: 394,998

[22] Filed: Feb. 27, 1995

[51] Int. Cl.$^6$ .................................................. G03B 17/38
[52] U.S. Cl. .................................................. 354/266
[58] Field of Search ........................ 354/131, 266; 359/142, 145, 146, 148; 340/825.69, 825.73, 825.76, 825.82

[56] References Cited

U.S. PATENT DOCUMENTS

| | | | |
|---|---|---|---|
| 3,710,122 | 1/1973 | Burcher et al. | 359/132 |
| 4,036,762 | 7/1977 | Troetscher et al. | 359/148 |
| 5,072,247 | 12/1991 | Bovee | 354/266 |
| 5,255,038 | 10/1993 | Suzuka | 354/266 |
| 5,270,764 | 12/1993 | Ichihara | 354/403 |
| 5,305,041 | 4/1994 | Ichikawa et al. | 354/266 |
| 5,323,203 | 6/1994 | Maruyama et al. | 354/410 |
| 5,325,143 | 6/1994 | Kawano | 354/266 |

*Primary Examiner*—Howard B. Blankenship
*Attorney, Agent, or Firm*—David A. Howley

[57] ABSTRACT

A camera and remote control mechanism for controlling operation of the camera includes a camera housing, one or more controllable mechanisms disposed in the camera housing, a remote controller separate from the camera housing for transmitting radiation towards the camera, a detector connected to the camera housing for detecting radiation from the remote controller, and control means for controlling the one or more controllable mechanisms when the detector detects radiation from the remote controller. The remote controller transmits visible laser radiation which is transmitted in a first state for aiming the remote controller at the camera and for controlling at least one controllable mechanism in the camera housing preparatory to the camera recording an image, and which is transmitted in a second state for actuating a camera shutter to record an image.

11 Claims, 5 Drawing Sheets

5,541,695

CAMERA WITH LASER REMOTE CONTROLLER

FIELD OF THE INVENTION

The invention relates generally to the field of photography, and in particular to cameras. More specifically, the invention relates to a camera which is controllable by a laser remote controller.

BACKGROUND OF THE INVENTION

On certain occasions a camera user desires to be part of the scene that is being recorded by the camera. This can be accomplished with a self-taking picture camera. One way to accomplish such a self-taking picture is by using a camera with a self-timer shutter delay option that trips the camera shutter after a delay period. When using a camera with a self-timer shutter delay, the camera is placed on a steady surface and the picture taker presses a self-timer switch and then a shutter button. The camera then starts a fixed time delay before the shutter is tripped. During this time delay the picture taker has approximately ten seconds to run in front of the camera and get positioned into the scene being recorded.

If the picture taker wishes to take another self-timer picture, (s)he needs to go back to the camera to initiate the self-timer again and then run back to the scene. Obviously, such an arrangement is less than optimal. Further, typical cameras with a self-timer shutter delay feature restrict the shutter tripping to a fixed time delay. Not being able to vary the time delay limits the use of the self-timer shutter delay feature.

An improvement over the camera self-timer has recently been disclosed in which a detachable remote controller with an infra-red transmitter is used to trip the camera shutter or operate some other camera function. An example of such a camera with infrared remote controller is disclosed in U.S. Pat. No. 5,323,203. Such a remote controller provides opportunities for the picture taker to take more than one picture without going back to the camera, and does not restrict the shutter tripping to a fixed delay time.

While the infra-red camera remote controller provides advantages over the self-timer camera, it also has the disadvantage of a range limitation of approximately 12 meters. The reason for this limitation is that the intensity of the infra-red light decreases by the inverse square of the distance between the remote controller and the camera. A further disadvantage of the infra-red remote controller is that the emitted infra-red beam cannot be seen by the picture taker. The aiming of the remote controller becomes more critical as the distance between the remote controller and the camera increases. If the operator cannot see the infrared beam it will become increasingly difficult to properly aim the remote controller to operate the camera as the distance between the remote controller and the camera increases.

SUMMARY OF THE INVENTION

The present invention is directed to overcoming one or more of the problems set forth above. Briefly summarized, according to one aspect of the present invention, a camera and remote control mechanism for controlling operation of the camera includes a camera housing, one or more controllable mechanisms disposed in the camera housing, a remote controller separate from the camera housing for transmitting radiation towards the camera, a detector connected to the camera housing for detecting radiation from the remote controller, and control means for controlling the one or more controllable mechanisms when the detector detects radiation from the remote controller. The remote controller transmits visible laser radiation which is transmitted in a first state for aiming the remote controller at the camera and for controlling at least one controllable mechanism in the camera housing preparatory to the camera recording an image, and which is transmitted in a second state for actuating a camera shutter to record an image.

By using a laser beam rather than an infrared light beam, a much longer operating range for the remote controller is obtained. This is true because the beam intensity of the laser beam does not fall off with the inverse square of the distance between the remote controller and the camera.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
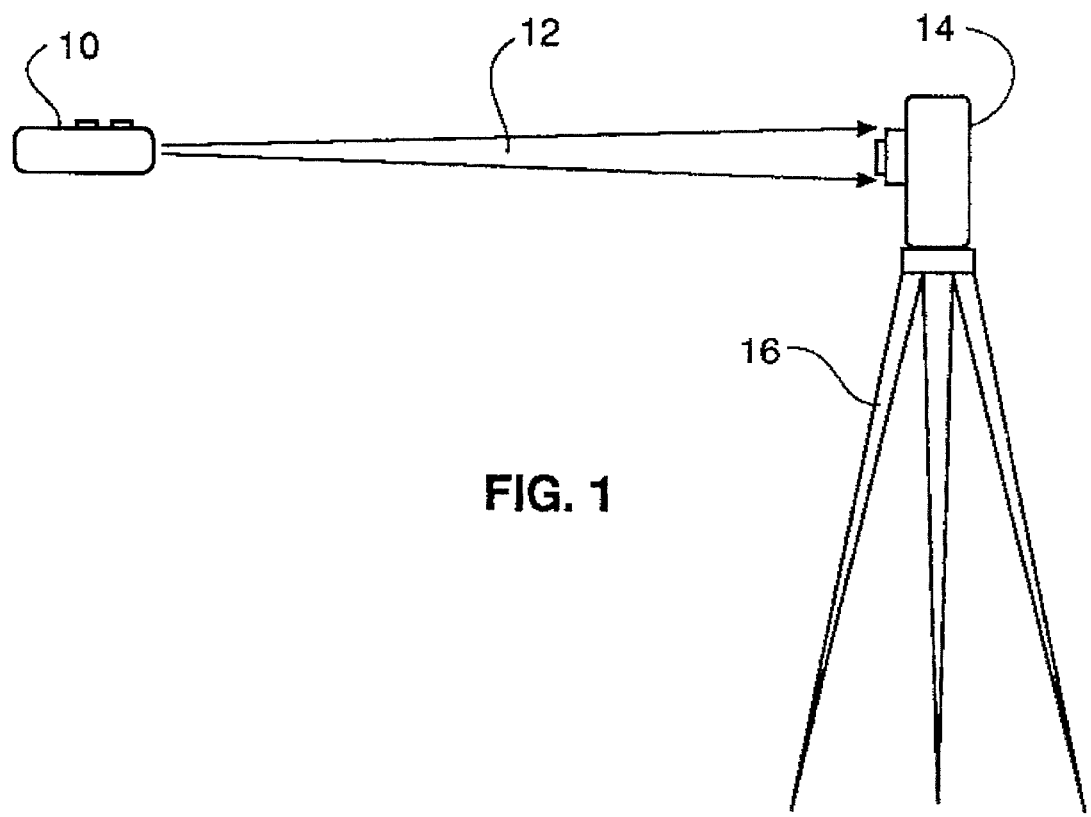
FIG. 1 is a side schematic view of a camera mounted on a tripod and a laser remote controller used to operate the camera.

Beginning with FIG. 1, a laser remote controller 10 emits a laser beam 12, preferably visible to an unaided human eye, when operated by a camera user. The visible laser beam is used by the camera user to both aim the remote controller and to operate a camera 14 which is supported by a tripod 16 or some other surface which can support the camera in a steady state. Because the laser beam remains highly collimated as it emanates away from the remote controller, it can be used to operate the camera at much greater distances than with infra-red (IR) radiation whose intensity falls off with the inverse square of the camera-remote controller distance. Further, while IR radiation is not visible to the unaided human eye, particular types of laser light are visible, thereby allowing the camera user to much more accurately aim the remote controller at the camera.

Figure 2:
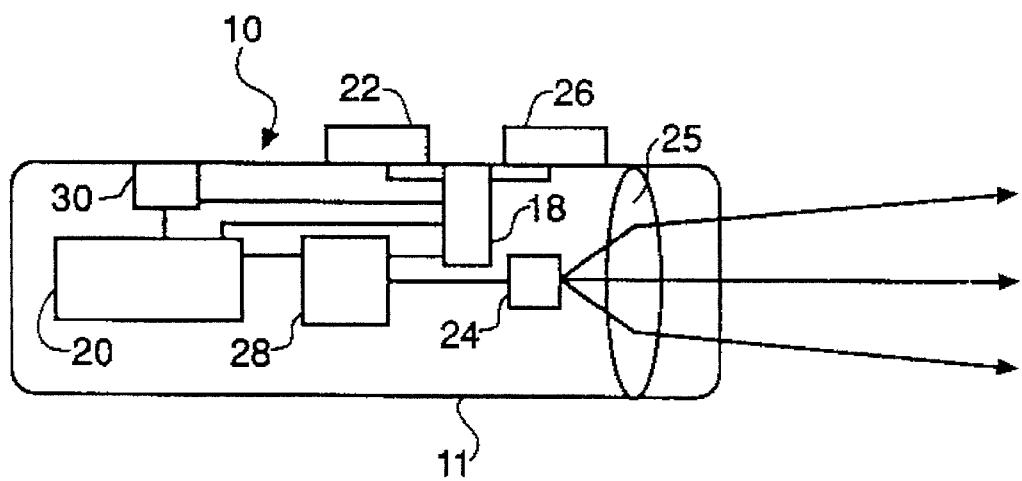
FIG. 2 is a side sectional schematic view of the laser remote controller of FIG. 1.

Turning to FIG. 2, a more detailed description of laser remote controller 10 will be provided. A microprocessor 18, contained within a casing 11, controls the operation of the remote controller, and a battery 20 provides electrical power to the various components in the remote controller. A power on/off switch 22 is manipulated by the camera user to cause a laser diode 24 to be turned on to emit laser light in a first state (see FIG. 4) for aiming the remote controller at the camera and for initiating initial camera functions such as focusing, flash charging, etc. Switch 22 is also used to turn the laser diode off. A lens 25 is used to focus the laser light into a collimated beam 12. Lens 25 can be manually moved to adjust the focus of the laser beam. A remote trigger switch 26 is operated by the camera user to alter the laser light to a second state (see FIG. 5) which signals the camera to record an image (trip the shutter). A laser power drive circuit board 28 supplies electrical power to laser diode 24 for causing the laser diode to emit laser light. A photodiode 30 measures the ambient light level in order that the brightness of the laser light can be adjusted to be visible under a variety of ambient light conditions (see FIG. 6).

Rather than using a separate on/off switch and trigger switch, a single two level push-button switch can be used. Such a two level switch is commonly used for camera shutter buttons where the first level actuates an autofocus function of the camera and the second level causes the camera to record an image. In the present invention, the first level is used to turn the laser on in its first state and the second level is used to switch the laser to its second state.

Figure 3:
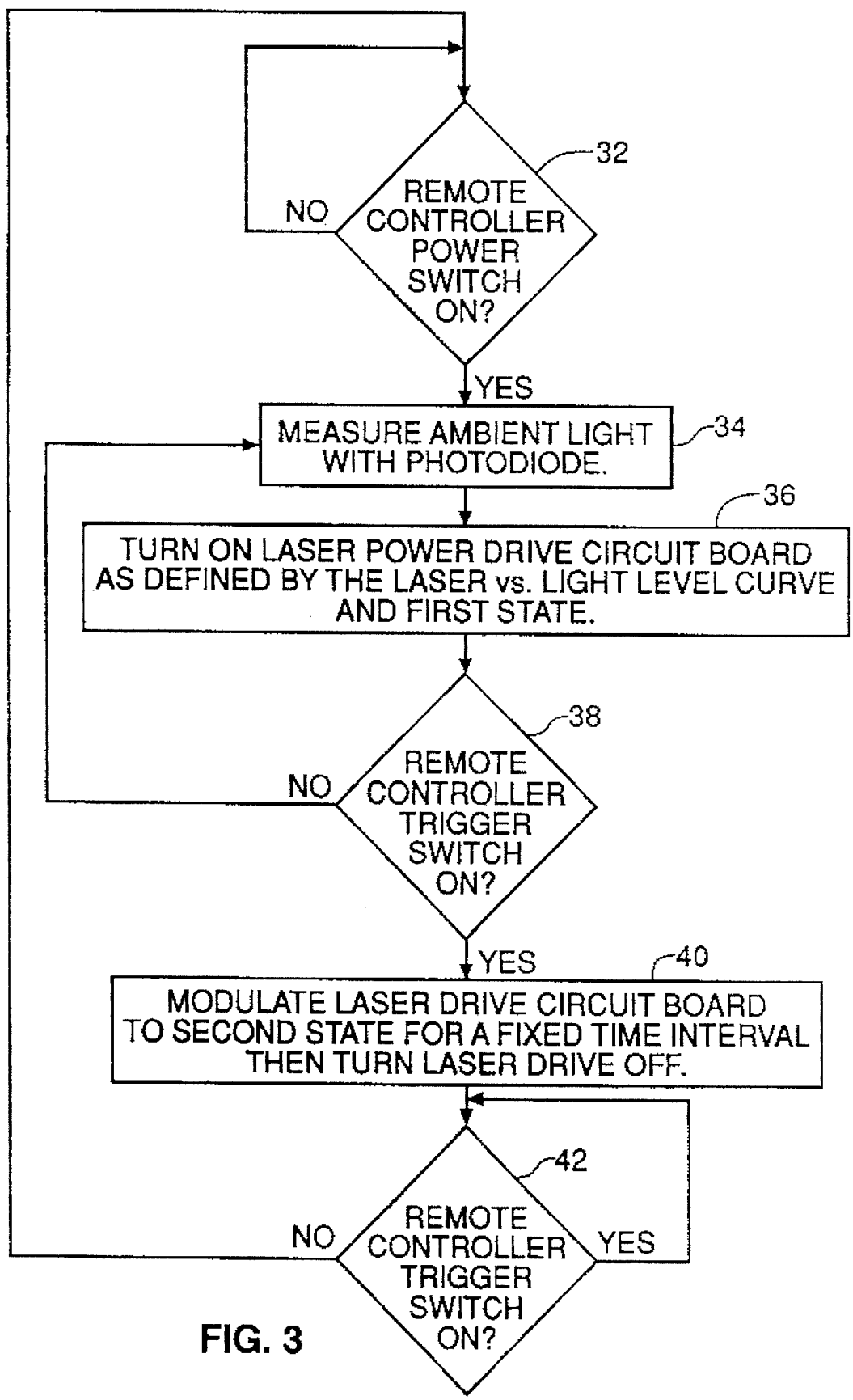
FIG. 3 is a flow diagram of logic used by the laser remote controller of FIG. 2.
Figure 4:
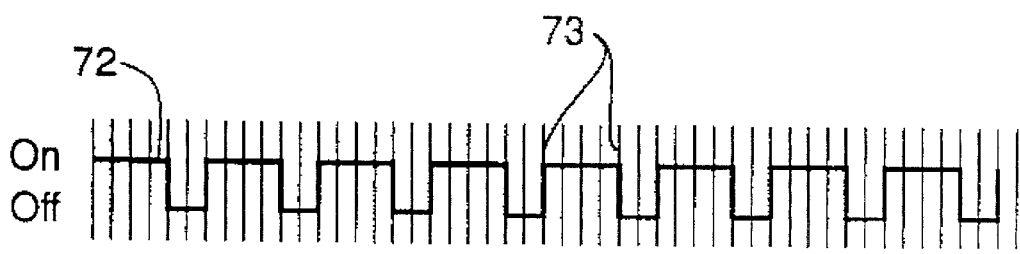
FIG. 4 is a plot of current vs. time for the electric signal applied to a laser diode during an aim state.

Referring to FIG. 3, the logic used by microprocessor 18 to control the remote controller will be described. At a step 32 microprocessor 18 interrogates power switch 22 to determine whether or not switch 22 has been turned on by the camera user. If switch 22 has been turned on, the microprocessor then checks the ambient light level as measured by photodiode 30 at a step 34. At a step 36, microprocessor 18 causes laser power drive circuit board 28 to be turned on and operated according to the laser level (brightness) vs. ambient light level curve (FIG. 6) and a first aiming/initial camera function state (FIG. 4). The above steps result in a visible laser beam being emitted from the remote controller which the camera user utilizes to aim the remote controller at the camera and to actuate initial camera functions such as flash charging if necessary and ambient scene light measurement.

Next, the microprocessor interrogates remote control trigger switch 26 at a step 38 to determine whether or not switch 26 has been operated by the camera user. If switch 26 has been operated, the microprocessor then modulates the laser power drive circuit board at a step 40 to a second triggering state for a short fixed time interval and then turns the laser power drive circuit board off. The laser diode is switched off shortly after the trigger switch is pressed so that the laser beam will not appear in the recorded image. As a result, the laser beam is transmitted at a second state which is detected by the camera, causing the camera to commence a picture taking sequence and record an image. After the laser diode has been shut off, microprocessor 18 checks trigger switch 26 at step 42 to determine whether or not it is still being operated by the camera user. The logic will not allow the camera user to record another image until the trigger switch has been switched off (released). Once trigger switch 26 is switched off, the logic flow returns to step 32.

Figure 5:
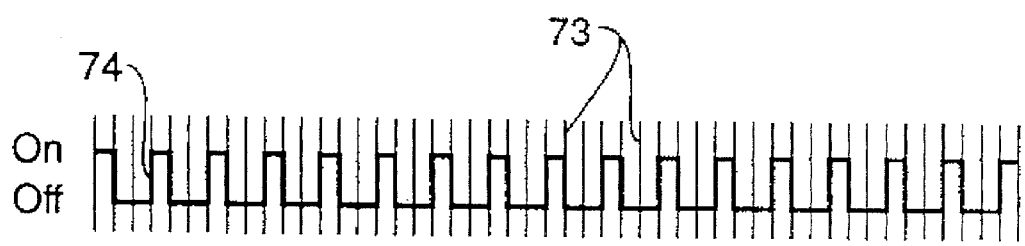
FIG. 5 is a plot of current vs. time for the electric signal applied to a laser diode during a trigger state.

Turning to FIGS. 4 and 5, a PWM'd electrical signal used to drive the laser diode will be described. FIG. 4 represents a first state of the laser drive used for aiming the remote controller and for commencing initial camera functions. A signal 72 represents electrical current (vertical axis) vs. time (horizontal axis). The current is rapidly turned on and off at a first frequency and at a first pulse width modulation (duty cycle) to cause the laser diode to emit bursts of laser light in a first state (energy level). In FIG. 4, the current is on during four time intervals (represented by the series of vertical lines 73) and off during two time intervals for each duty cycle. The result is a relatively bright laser beam which is useful in aiming the remote controller.

In FIG. 5, the current 74 is changed to a second state (energy level) after the camera user presses trigger switch 26. In FIG. 5 current 74 is turned on and off at a second frequency and at a second pulse width modulation. Note that the current is on for only one time interval and off for two time intervals during each cycle. This results in a laser beam of diminished brightness. The camera detects this second state of the laser radiation and records an image (actuates the shutter, fires the flash etc.). The energy level of the laser beam can also be varied by changing the amplitude of the current signal, or by changing both the amplitude and pulse width modulation of the current signal.

Figure 6:
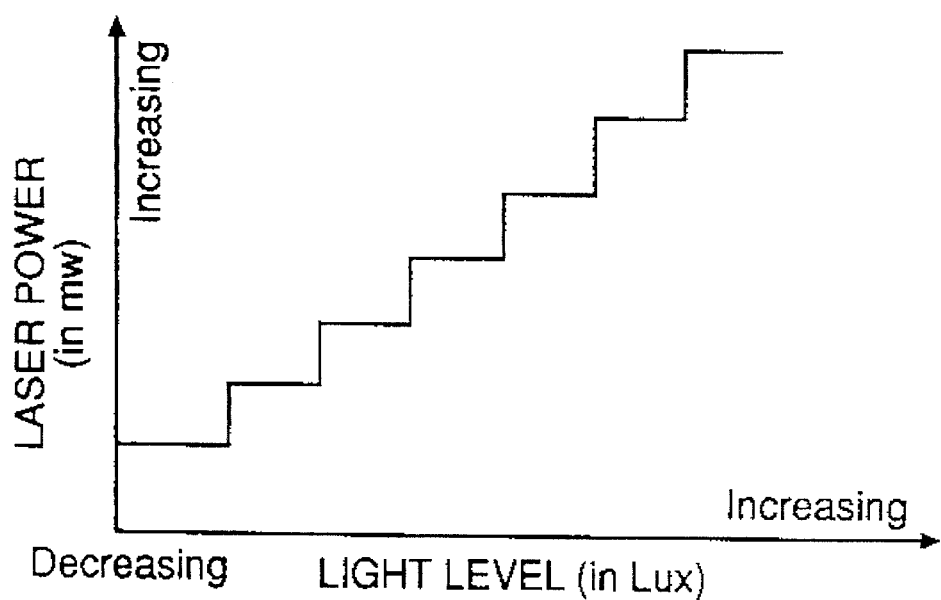
FIG. 6 is a plot of laser power vs. ambient light level.

FIG. 6 represents a plot of the laser power vs. ambient light level as measured by photodiode 30. As the ambient light level increases, so to is the power supplied to the laser diode. This results in a brighter laser beam which can be seen in bright ambient light conditions such as during a sunny day. As the ambient light level decreases, so to is the power supplied to the laser diode. This results in a less bright laser beam which can still be seen in diminished ambient light conditions, such as at night, while conserving battery power. The laser power is changed by altering the current supplied to the laser diode. Such a change will alter the current signal shown in FIGS. 4 and 5 in the vertical direction but not the horizontal direction.

Figure 7:
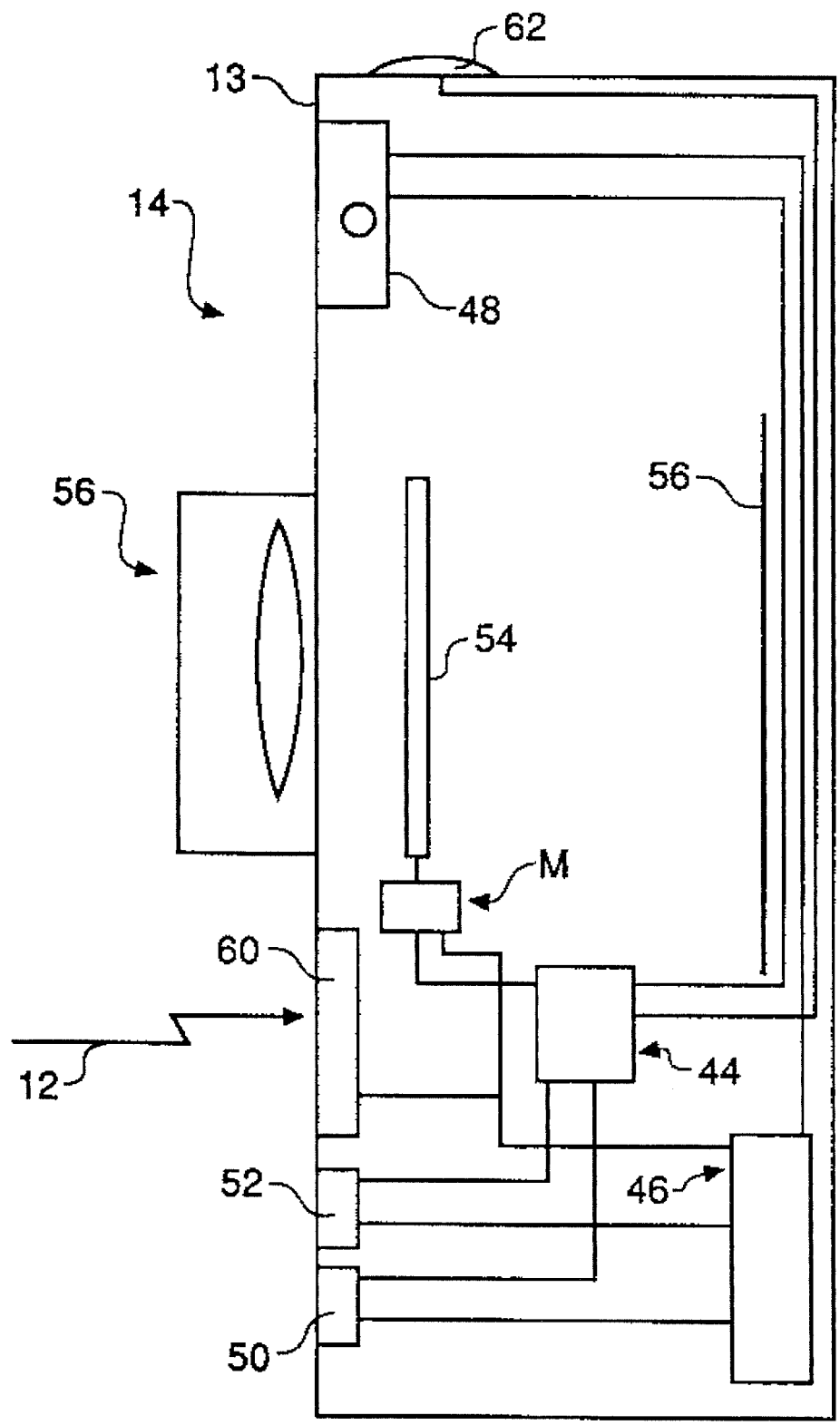
FIG. 7 is a side sectional schematic view of the camera of FIG. 1.

Referring to FIG. 7, a camera having one or more controllable mechanisms and controllable by laser remote controller 10 will be described. Camera 14 includes a housing 13 and a microprocessor 44 used to control operation of the camera. A battery 46 supplies electrical power to the various camera components, and a flash 48 provides supplemental illumination for deficiently lit scenes. A photodiode 50 measures ambient scene light and a range finder 52 determines a camera-to-scene distance. An electric motor M opens and closes an aperture/shutter mechanism 54 to expose photographic film 56 (or an electronic image sensor) to scene light to record an image. An objective lens 58 focuses the scene light onto the film. A laser light detector 60, which preferably is particularly sensitive to the frequency band of the laser light beam, is utilized to detect the laser light beam emitted from laser remote controller 10. A two-level shutter button 62, well known to those skilled in the art, is used to both actuate a camera function preparatory to taking a picture (e.g. autofocusing) and commence an image recording sequence in a conventional manner.

Figure 8:
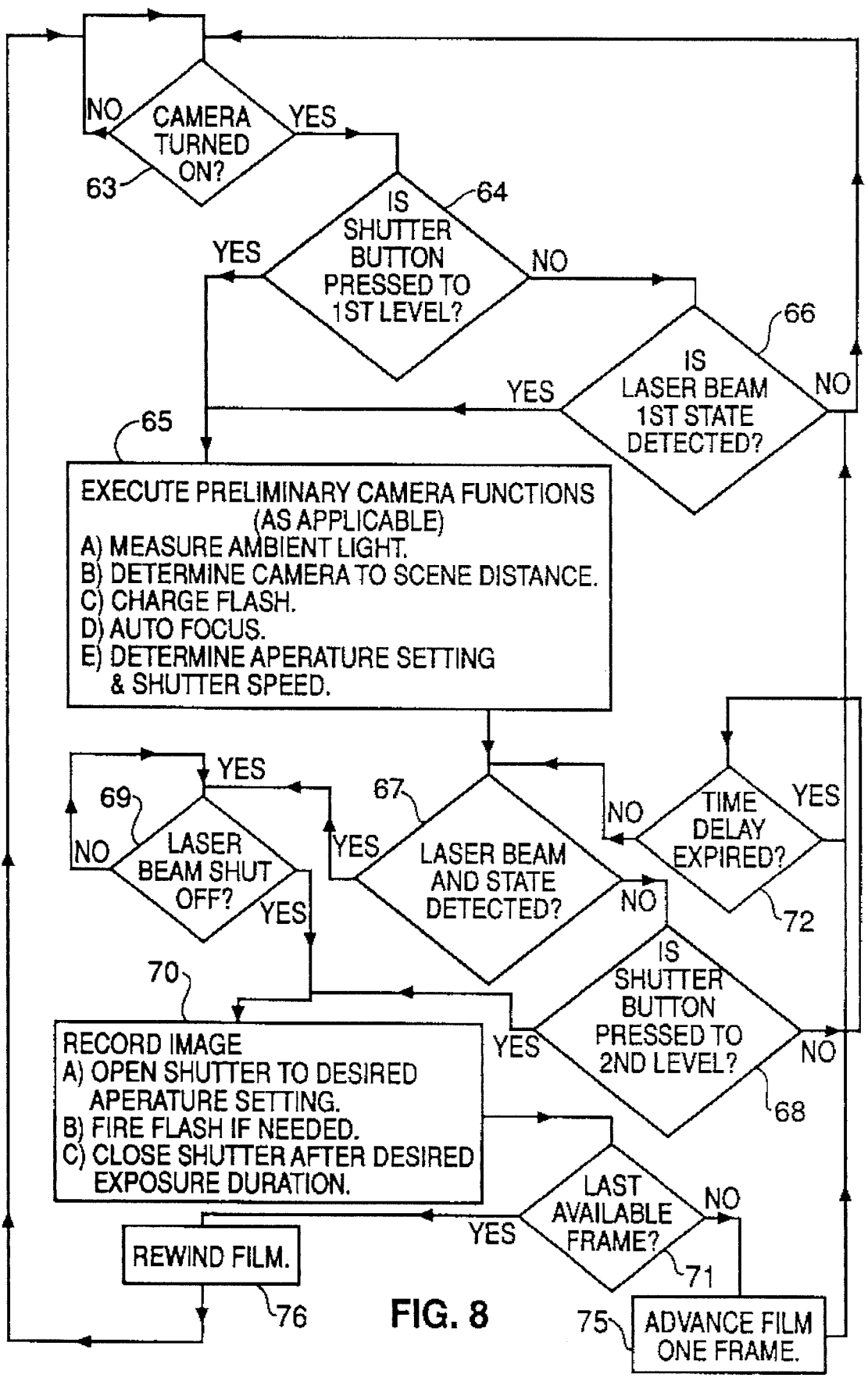
FIG. 8 is a flow diagram of logic used by the camera of FIG. 7.

Turning to FIG. 8, logic utilized by microprocessor 44 to control the operation of camera 14 will be described. At a step 63 the microprocessor checks to determine whether or not the camera has been turned on. If the camera has been turned on microprocessor 44 interrogates shutter button 62 at a step 64 to determine whether or not the shutter button has been pressed to its first level. If the shutter button has been pressed to its first level, the logic proceeds to a step 65. If the shutter button has not been pressed, microprocessor 44 interrogates laser light sensor 60 at a step 66 to determine whether or not sensor 60 has detected a laser beam in its first state from remote controller 10. If the laser beam is detected in its first state by sensor 60, the logic proceeds to step 65 which causes preliminary camera functions, preparatory to recording an image, to be executed.

At a step 67, microprocessor 44 interrogates sensor 60 to determine whether or not there has been a laser beam state change to a second state. If a state change is detected, microprocessor 44 determines at a step 69 whether the laser beam has been shut off. If the laser beam has been shut off, the logic proceeds to a step 70. If no state change is detected at step 67, microprocessor 44 determines at a step 68 whether or not the shutter button was pressed to a second level. If the shutter button was pressed to a second level, the logic proceeds to a step 70 where the logic causes an image to be recorded by the camera.

If the shutter button was not pressed to a second level, the logic proceeds to a step 72 where the logic starts a time-out period during which it is determined whether the laser beam 2nd state or the shutter button second level has been achieved. If the time delay has not expired, the logic returns to step 67 to check the laser state and possibly the shutter button level again. If the time delay has expired, the logic returns to step 63 where the logic process begins again.

After recording the image, microprocessor determines at a step 71 whether or not the last available film frame has been used. If the last available film frame has not been used, the film is advanced by one frame at a step 75 in preparation for the next image recordation. If the last available film frame has been used, the film is rewound at a step 76.

The invention has been described with reference to a preferred embodiment. However, it will be appreciated that variations and modifications can be effected by a person of ordinary skill in the art without departing from the scope of the invention.

PARTS LIST

10 laser remote controller
11 casing
12 laser beam
13 camera housing
14 camera
16 tripod
18 microprocessor
20 battery
22 on/off switch
24 laser diode
25 lens
26 trigger switch
28 circuit board
30 photodiode
32–42 logic steps
44 camera microprocessor
46 battery
48 flash
50 photodiode
52 range finder
54 aperture/shutter
M electric motor
56 film
58 objective lens
60 laser light sensor
62 shutter button
63–71 & 75–76 camera logic steps
72 signal
73 time intervals
74 signal

We claim:

1. A camera and remote control mechanism for controlling operation of the camera, comprising a camera housing, one or more controllable mechanisms disposed in the camera housing, a remote controller separate from the camera housing for transmitting radiation towards the camera, a detector connected to the camera housing for detecting radiation from the remote controller, and control means for controlling the one or more controllable mechanisms when the detector detects radiation from the remote controller, is characterized in that:

said remote controller transmits visible laser radiation which is transmitted in a first state for aiming said remote controller at said camera and for controlling at least one controllable mechanism in said camera housing preparatory to said camera recording an image, and which is transmitted in a second state for actuating a camera shutter to record an image.

2. The camera and remote controller of claim 1, wherein said remote controller includes means for measuring an ambient light level and means for adjusting the intensity of the visible laser radiation emitted by the remote controller such that the perceived brightness of the visible laser radiation appears essentially constant as the ambient light level varies.

3. The camera and remote controller of claim 1, wherein said first state of said laser radiation is a first frequency and said second state of said laser radiation is a second frequency.

4. The camera and remote controller of claim 1, wherein said first state of said laser radiation is a first energy level and said second state of said laser radiation is a second energy level.

5. A remote control mechanism for controlling operation of a camera having a camera housing, one or more controllable mechanisms disposed in the camera housing, a detector connected to the camera housing for detecting radiation emitted from the remote control mechanism, and control means for controlling the one or more controllable mechanisms when the detector detects radiation from the remote control mechanism, is characterized by:

a remote controller, separate from the camera housing, for transmitting visible laser radiation towards the camera, said visible laser radiation being transmitted in a first state for aiming said remote controller at said camera and for controlling at least one controllable mechanism in said camera housing preparatory to said camera recording an image, and which is transmitted in a second state for actuating a camera shutter to record an image.

6. The remote control mechanism of claim 5, wherein said first state of said laser radiation is a first frequency and second state of said laser radiation is a second frequency.

7. The remote control mechanism of claim 5, wherein said first state of said laser radiation is a first energy level and said second state of said laser radiation is a second energy level.

8. The remote control mechanism of claim 5, wherein said remote controller includes means for measuring an ambient light level and means for adjusting the intensity of the visible laser radiation emitted by the remote controller such that the perceived brightness of the visible laser radiation appears essentially constant as the ambient light level varies.

9. A camera usable with a remote controller separate from a camera housing and capable of controlling operation of the camera by transmitting radiation towards the camera, comprises one or more controllable mechanisms disposed in the camera housing, a detector connected to the camera housing for detecting the radiation from the remote controller, and control means for controlling the one or more controllable mechanisms when the detector detects radiation from the remote controller, is characterized by:

said control means controlling at least one controllable mechanism in said camera housing preparatory to said camera recording an image upon said detector detecting visible laser radiation transmitted from said remote controller in a first state for aiming said remote controller at said camera, said control means actuating a camera shutter to record an image upon said detector detecting visible laser radiation transmitted in a second state.

10. The camera of claim 9, wherein said first state of said laser radiation is a first frequency and said second state of said laser radiation is a second frequency.

11. The camera of claim 9, wherein said first state of said laser radiation is a first energy level and said second state of said laser radiation is a second energy level.

* * * * *